Sept. 21, 1965     C. H. HASCHE     3,207,528

CHILD'S SEAT AND CARRIAGE

Filed March 26, 1963     3 Sheets-Sheet 1

INVENTOR
Carl H. Hasche
BY John Flann
ATTORNEY

Sept. 21, 1965     C. H. HASCHE     3,207,528
CHILD'S SEAT AND CARRIAGE
Filed March 26, 1963     3 Sheets-Sheet 2

INVENTOR
Carl H. Hasche
BY John Flam
ATTORNEY

Sept. 21, 1965  C. H. HASCHE  3,207,528
CHILD'S SEAT AND CARRIAGE
Filed March 26, 1963  3 Sheets-Sheet 3
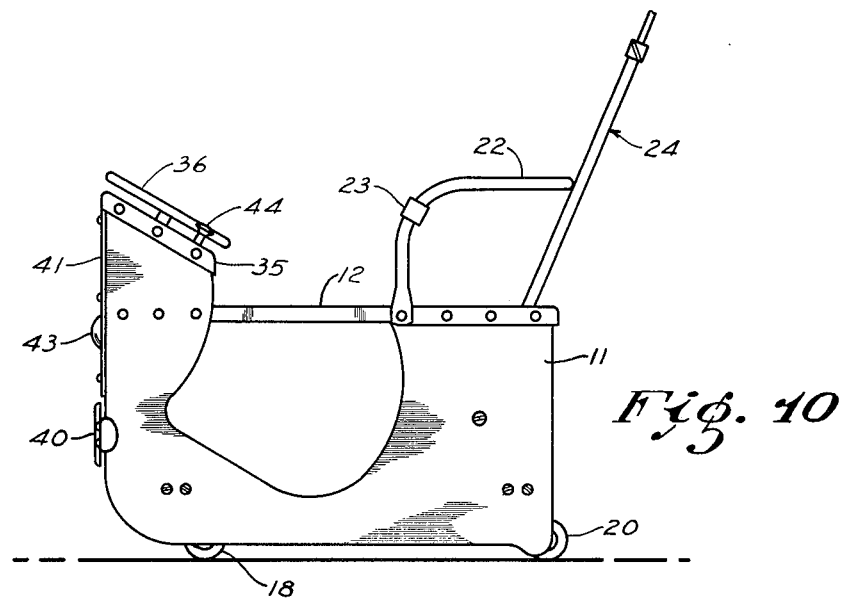
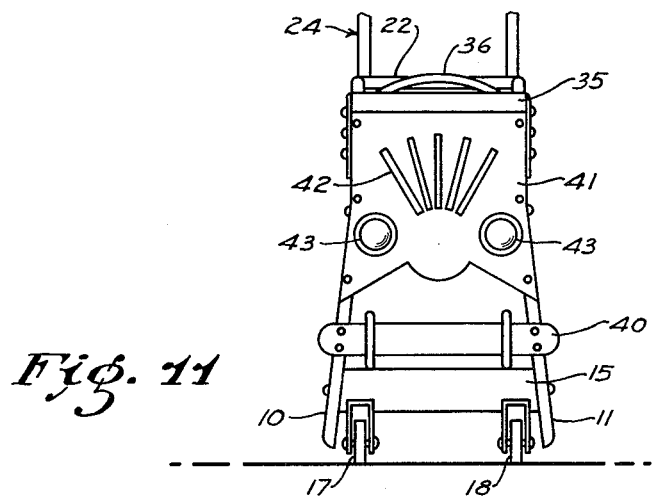
INVENTOR
Carl H. Hasche
BY John Flam
ATTORNEY

United States Patent Office 3,207,528
Patented Sept. 21, 1965

3,207,528
CHILD'S SEAT AND CARRIAGE
Carl H. Hasche, 324 W. Garfield, Glendale 4, Calif.
Substituted for abandoned application Ser. No. 698,538, Sept. 21, 1946. This application Mar. 26, 1963, Ser. No. 268,116
1 Claim. (Cl. 280—47.38)

This invention relates to a carriage and seat structure, and particularly to one capable of use by a child.

It is an object of this invention to provide a carriage which may be placed on an automobile seat to accommodate a child in a secure and comfortable manner, and which may be used optionally as a go-cart.

It is another object of this invention to provide such a structure which may be lifted into a car or removed therefrom with the child in place.

It is still another object of this invention to provide such a structure having a novel form of handle adaptable for manipulating the structure as a go-cart, or for retaining the structure in place when used in an automobile as a child's seat.

It is still another object of this invention to provide such a structure which may be fabricated in a simple and economical manner, and which is strong and durable.

This invention posseses many other advantages, and has other objects which may be made more clearly apparent from a consideration of several embodiments of the invention. For this purpose, there are shown a few forms in the drawings accompanying and forming part of the present specification, and which drawings, unless as otherwise indicated, are true scale. These forms will now be described in detail, illustrating the general principles of the invention; but it is to be understood that this detailed description is not to be taken in a limiting sense, since the scope of the invention is best defined by the appended claims.

Figure 9:
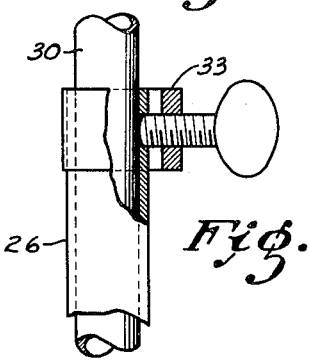
Figure 5:
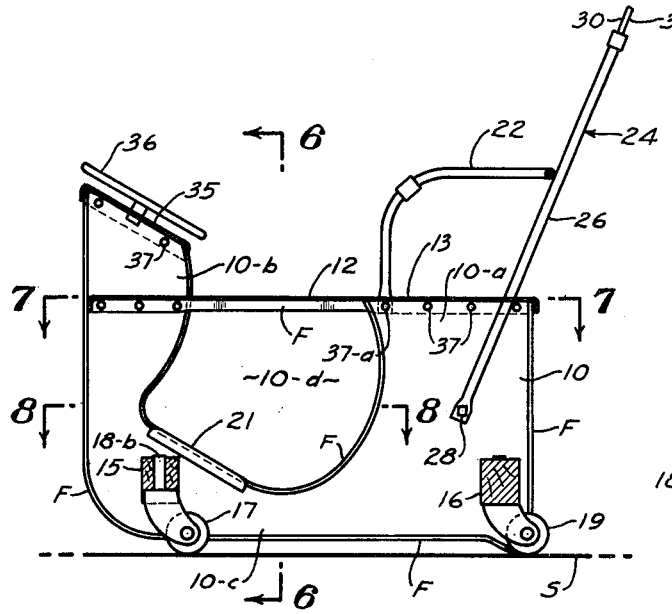
FIG. 5 is a longitudinal section on an enlarged scale, taken as indicated by line 5—5 of FIG. 2, the handle being broken away to reduce the size of the figure.
Figure 6:
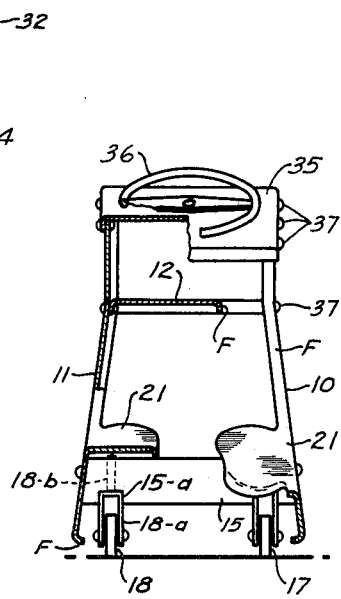
Figure 7:
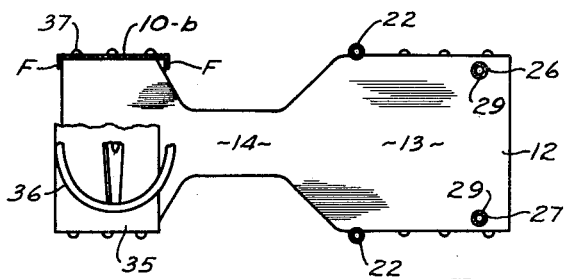
Figure 8:
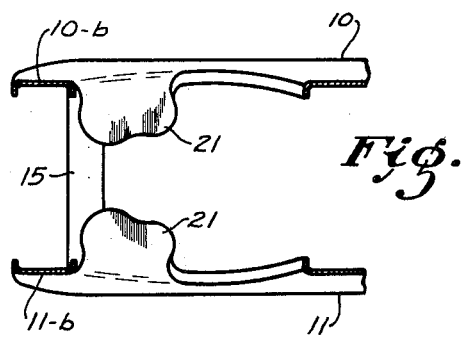

FIGS. 6, 7, and 8 are sections taken as indicated by correspondingly numbered lines of FIG. 5;

FIG. 9 is a detail of the handle;

FIG. 10 is a side elevation of a modified form of carriage; and

FIG. 11 is a front elevation of the carriage of FIG. 10.

Figure 1:
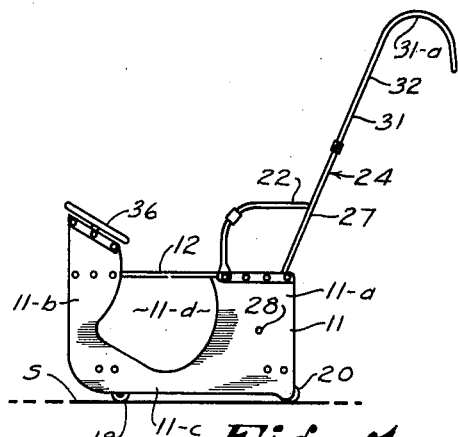
FIGURE 1 is a side elevation showing the carriage of the invention in use.
Figure 2:
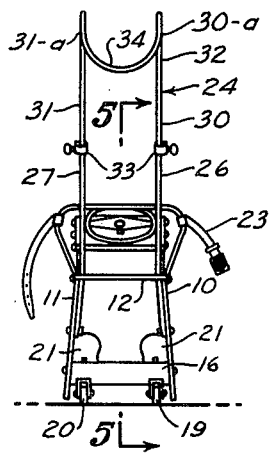
FIG. 2 is a rear elevation of the carriage.

Referring to the drawings, particularly FIGS. 1, 5, and 6, the structure comprises a pair of side members or frames 10 and 11, preferably of sheet metal. The frame 10 comprises upstanding front and rear portions 10a and 10b, joined by a horizontal lower portion 10c and separated to provide a leg space 10d. The frame 11 is substantially identical except for being of the opposite hand, the corresponding portions being indicated by the numeral 11 plus the same suffix.

The frames 10 and 11 are connected in spaced relation by a horizontal member 12 (FIG. 6) substantially equal in length with the side frames 10 and 11 and joined to the upstanding portions 10a and 10b, and 11a and 11b. The rear portion 13 of the member 12 forms the carriage seat, the member 12 ahead of the seat and opposite the leg spaces 10d and 11d being of reduced width as indicated at 14, so as to be easily straddled by a child on seat 13. This member 12 may likewise be made of sheet metal.

The front portion of the member 12 forms a shelf upon which the child may place toys or the like.

The side frames 10 and 11 are connected adjacent their lower edges by bars or struts 15 and 16 respectively, near the front and rear of the frames. These bars 15 and 16 may be formed conveniently of wood, and are preferably of such length as to spread the frames (FIG. 6) thus increasing the stability of the structure. Thus, these frames are farther apart at the bottom, as shown most clearly in FIG. 6.

Pairs of rollers 17, 18 19 and 20 are mounted respectively on the cross bars 15 and 16 near the side frames. These rollers may be ordinary casters secured to bars 15 and 16 as by making their brackets, such as 18a, to fit tightly in a groove, as 15a, formed in the cross bar, the shank 18b of the caster being accommodated in a hole in the bar. In this way, the casters are prevented from swivelling, and are parallel at all times with the side frames.

A foot rest 21 (FIG. 8) extends horizontally inward from each frame 10 and 11, adjacent the lower end of the leg spaces 10d and 11d. The foot rests 21 extend forwardly and upwardly so as to support comfortably the feet of a child on the seat 13. Furthermore, as clearly shown in FIGS. 5 and 6, the foot rests 21 are arranged to be supported by the forward cross bar 15, so there is no danger of their being bent or damaged by excessive weight. These foot rests are preferably formed integrally with frames 10 and 11, being bent inwardly therefrom.

A piece of tubing or light bar stock 22 is arranged to form the sides and back of the seat 13, and a conventional strap 23 may be provided for securing the child on the seat 13.

A handle structure 24 is provided for manipulating the carriage. This may comprise tubular members 26 and 27 secured at their lower ends to the frames 10 and 11, respectively, as by bolts 28 (FIG. 5). These members extend rearwardly and upwardly through suitable openings 29 in the member 12, and telescopically accommodate the legs 30 and 31 of an extension 32. A conventional clamp 33 (FIG. 9) on each member 26 and 27 serves to secure the members 26 and 30 together. The upper end of each leg 30, 31 is bent over and down to form the downwardly opening curved portions 30a and 31a. These are connected, as at 34, to form a hook.

As indicated in FIGS. 1 and 5, the carriage is well adapted for use as a go-cart, the rollers 17, 18, 19, and 20 permitting ready movement over the ground surface "S." In this case, the handle 24 is extended so that the upper end of the extension 32 may be grasped conveniently by one handling the carriage.

Figure 4:
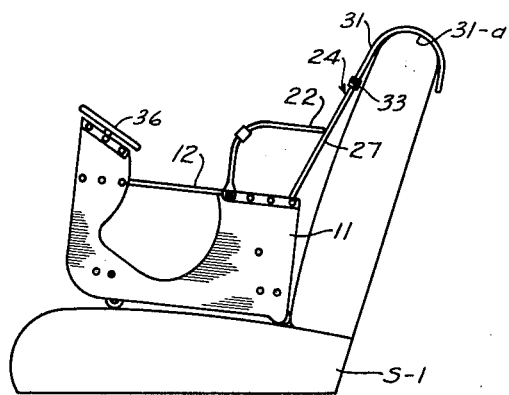
FIG. 4 is a view, similar to FIG. 1, showing another manner of use.
Figure 3:
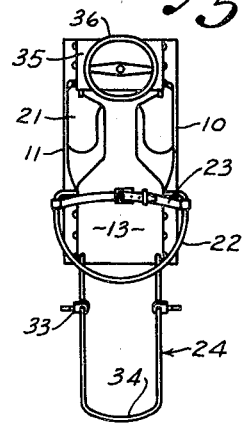
FIG. 3 is a top plan view thereof.

Optionally, the carriage may be mounted on an automobile seat "S–1," as shown in FIG. 4. In this case, the handle 24 is shortened so that the curved portions 30a and 31a hook over the seat back, thus serving to retain the carriage on the seat and to prevent its overturning as well. The carriage may be taken from the car and placed on the ground, or vice versa, without removing the child, adjustment of the handle being the only change required.

In addition to providing a comfortable seat for a child in a car, the structure is arranged to provide entertainment. For this purpose, the front upstanding frame portions 10b and 11b extend above the horizontal member 12, and are connected by a plate 35 which may be decorated to simulate the instrument panel of an automobile. Rotatable mounted upon the plate 35 is a small wheel 36, simulating a steering wheel.

To provide a light weight structure, the members 10, 11, and 12, and the panel 35 are preferably formed of light gauge sheet metal, such as aluminum, or the like. Similarly, aluminum tubing may be used for the handle 24, the steering wheel 36, and the seat back 22. To ensure adequate strength, the exposed edges of the sheet metal members are flanged, as indicated at "F" in FIGS. 5, 6, 7, and 8. The horizontal member 12 is secured to the side members 10 and 11 as by rivets 37, which pass through the flanges on the member 12. A corresponding one of these rivets in each side member, as 37a, serves to secure the seat back 22. Panel 35 may be similarly secured.

The foot rests 21 are shown as formed integrally with the respective side member 10 or 11, and, similarly, is flanged for stiffness. Since the foot rest 21 and the flange F on the side member 10 or 11 extend in the same direction, these members may be formed by a simple stamping process. Similarly, the member 12 may be formed as a stamping.

The modified carriage illustrated in FIGS. 10 and 11 embodies the structural features just described, and is intended for use in the same manner. However, certain details, corresponding with prominent features of an automobile, have been added to enhance the appearance of the carriage.

Thus, a bumper bar 40, preferably rubber covered, is provided, and which extends across the front of the carriage, being suitably attached to the side frames 10 and 11. A front plate 41 is also provided above the bumper 40, having pressed ribs or cut-out portions 42 simulating a radiator grill, and glass insets 43 representing headlights. Additionally, one or more knobs or handles, such as 44, are mounted on plate 35 adjacent the steering wheel 36. Such handle or handles are movably mounted and arranged to operate a noise-making device such, for example, as a hand-operated Klaxon horn, or a rattle.

The inventor claims:

In a carriage structure: a pair of substantially U-shaped side members, each having spaced upstanding front and rear portions joined to a horizontally extending bottom portion to define laterally opening leg spaces; a horizontally extending seat member having a rear portion connected to the rear portions of said side members and having a front shelf portion connected to the front portions of said side members; said upstanding front portions extending above said shelf portion; a member simulating an instrument panel and joining the upper ends of said front portions of said side members and in spaced juxtaposed relationship with respect to said shelf portion; a front member cooperating with said instrument panel simulating member, said shelf portion and the upper ends of said front portions of said side members to define a recess facing the seat portion of said horizontal seat member; a pair of struts adjacent the bottom of said side members and located at the front and rear respectively; said struts spacing said side members farther apart than at said horizontal seat member; a pair of floor-contacting wheels mounted beneath each strut; means extending inwardly from each side member and adjacent the bottom of the leg spaces formed therein to provide a foot rest; a unitary tubular member attached at opposite ends to the rear seat portion and bent to form a back rest and arms about said rear seat portions; a pair of handle bars secured respectively to the side members and extending upwardly through said seat member behind said tubular members and backwardly from said side members, each of said pair of bars being curved at its upper end to provide a downwardly opening hook.

References Cited by the Examiner

UNITED STATES PATENTS

| | | |
|---|---|---|
| D. 147,367 | 8/47 | Hasche. |
| 942,679 | 12/09 | Spencer _____ 280—47.38 X |
| 1,213,017 | 1/17 | Reinert _____ 280—47.38 |
| 1,570,410 | 1/26 | Strauss _____ 280—47.38 X |
| 2,470,040 | 5/49 | Mackin et al. _____ 280—47.38 X |

BENJAMIN HERSH, *Primary Examiner.*

A. HARRY LEVY, *Examiner.*